(12) United States Patent
Kang et al.

(10) Patent No.: US 11,729,246 B2
(45) Date of Patent: Aug. 15, 2023

(54) APPARATUS AND METHOD FOR DETERMINING TYPES OF UNIFORM RESOURCE LOCATOR

(71) Applicant: NAVER CLOUD CORPORATION, Gyeonggi-do (KR)

(72) Inventors: Bong Goo Kang, Seongnam-si (KR); Min Seob Lee, Seongnam-si (KR); Won Tae Jang, Seongnam-si (KR); June Ahn, Seongnam-si (KR); Jihwan Yoon, Seongnam-si (KR)

(73) Assignee: NAVER CLOUD CORPORATION, Seongnam-si (KR)

( * ) Notice: Subject to any disclaimer, the term of this patent is extended or adjusted under 35 U.S.C. 154(b) by 0 days.

(21) Appl. No.: 16/799,345

(22) Filed: Feb. 24, 2020

(65) Prior Publication Data
US 2020/0311169 A1 Oct. 1, 2020

(30) Foreign Application Priority Data

Mar. 28, 2019 (KR) .................. 10-2019-0036361

(51) Int. Cl.
*G06F 16/955* (2019.01)
*H04L 67/02* (2022.01)

(52) U.S. Cl.
CPC .......... *H04L 67/02* (2013.01); *G06F 16/9558* (2019.01); *G06F 16/9566* (2019.01)

(58) Field of Classification Search
CPC ............ G06F 16/9566; H04L 63/0236; G06K 2209/01
See application file for complete search history.

(56) References Cited

U.S. PATENT DOCUMENTS

| | | | | |
|---|---|---|---|---|
| 6,519,626 B1* | 2/2003 | Soderberg | ............... | G06F 16/10 709/217 |
| 6,976,070 B1* | 12/2005 | Hoashi | ............... | G06F 16/9535 709/224 |
| 8,631,097 B1* | 1/2014 | Seo | ............... | G06F 16/9577 709/219 |
| 2009/0327466 A1* | 12/2009 | Lopez | ............... | H04L 61/301 709/223 |
| 2014/0245131 A1* | 8/2014 | Maohua | ............... | G06F 40/106 715/234 |
| 2019/0087506 A1* | 3/2019 | Choh | ............... | G06F 16/951 |

FOREIGN PATENT DOCUMENTS

EP 3301879 A1 4/2018

OTHER PUBLICATIONS

Notice of allowance issued in KR application No. 10-2019-0036361, dated Jan. 29, 2021.

* cited by examiner

*Primary Examiner* — Mohamed A. Wasel
*Assistant Examiner* — Tesfu N Mekonen
(74) *Attorney, Agent, or Firm* — Greer Burns & Crain Ltd.

(57) ABSTRACT

A URL address determining method includes receiving a URL address extracted from a target server; requesting a response corresponding to the URL address from the target server; when receiving response data from the target server, extracting a response URL address corresponding to the URL address from the response data; and determining a resource indicated by the URL address by using the response URL address.

4 Claims, 3 Drawing Sheets

APPARATUS AND METHOD FOR DETERMINING TYPES OF UNIFORM RESOURCE LOCATOR

CROSS-REFERENCE TO RELATED APPLICATIONS

This application claims priority to and the benefit of Korean Patent Application No. 10-2019-0036361 filed in the Korean Intellectual Property Office on Mar. 28, 2019, the entire contents of which are incorporated herein by reference.

BACKGROUND OF THE INVENTION

Field of Invention

The present invention relates to a uniform resource locator (URL) address determining apparatus and a URL address determining method, capable of determining the type of resource indicated by a URL address.

Description of Related Art

Recently, a flood of web services and user-friendly web interfaces have accelerated integration of traditional application programs into web-based systems. With the development of web services, adverse effects, such as problems with web applications themselves, programmer's ignorance of security, blocking incapacity of firewalls, avoidance of intrusion detection, and diversification of hacking tools, have emerged as serious problems.

In order to prevent various types of attacks on web applications, it is necessary to block the intrusion of attack code into each parameter included in the URL. In order to fundamentally block the intrusion of the attack code into each parameter, above all, it is necessary to determine whether vulnerability for each attack type exists for all parameters included in each URL.

BRIEF SUMMARY OF THE INVENTION

The present invention has been made in an effort to provide a uniform resource locator (URL) address determining apparatus and a URL address determining method, capable of exactly determining the type of resource indicated by a URL address by using the format of the URL address and a server response.

An exemplary embodiment of the present invention provides a method of determining a URL address, the method including: receiving a URL address extracted from a target server; requesting a response, corresponding to the URL address, from the target server; when receiving response data from the target server, extracting a response URL address, corresponding to the URL address, from the response data; and determining a resource indicated by the URL address by using the response URL address.

Another exemplary embodiment of the present invention provides a method of determining a URL address, the method including: receiving a URL address extracted from a target server; checking whether the last character of the URL address is a slash; requesting a response to the URL address from the target server when the last character of the URL address is not a slash; checking a response URL address included in response data when receiving response data from the target server; determining that the URL address indicates a file resource when the response URL address is the same as the URL address; and determining that the URL address indicates a directory resource when the response URL address has a slash added at the end of the URL address.

Still another exemplary embodiment of the present invention provides an apparatus for determining a URL address, the apparatus including: a reception unit configured to receive a URL address extracted from a target server; a response request unit configured to request a response, corresponding to the URL address, from the target server; an extraction unit configured to, when receiving response data from the target server, extract a response URL address, corresponding to the URL address, from the response data; and a determination unit configured to determine a resource indicated by the URL address by using the response URL address.

The technical solution does not enumerate all the features of the present invention. Various features of the present invention and the advantages and effects thereof may be understood in more detail with reference to the following specific embodiments.

According to the URL address determining apparatus and the URL address determining method according to exemplary embodiments of the present invention, it is possible to determine the type of resource indicated by the URL address by using a server response to the URL address in addition to the format of the URL address. That is, even when the format of the URL address is partially omitted, it is possible to accurately determine the type of resource indicated by the URL address through the server response.

According to the URL address determining apparatus and the URL address determining method according to exemplary embodiments of the present invention, it is possible to accurately determine the type of resource indicated by the URL address, which makes it possible to diagnose the vulnerability of the target server by setting a checking method and a determination criterion based on the type of resource indicated by each URL address.

However, the effects that the URL address determining apparatus and the URL address determining method according to the exemplary embodiments of the present invention can achieve are not limited to those mentioned above, and other non-mentioned effects will be clearly understood by those skilled in the art from the description below.

DETAILED DESCRIPTION OF THE INVENTION

Figure 1:
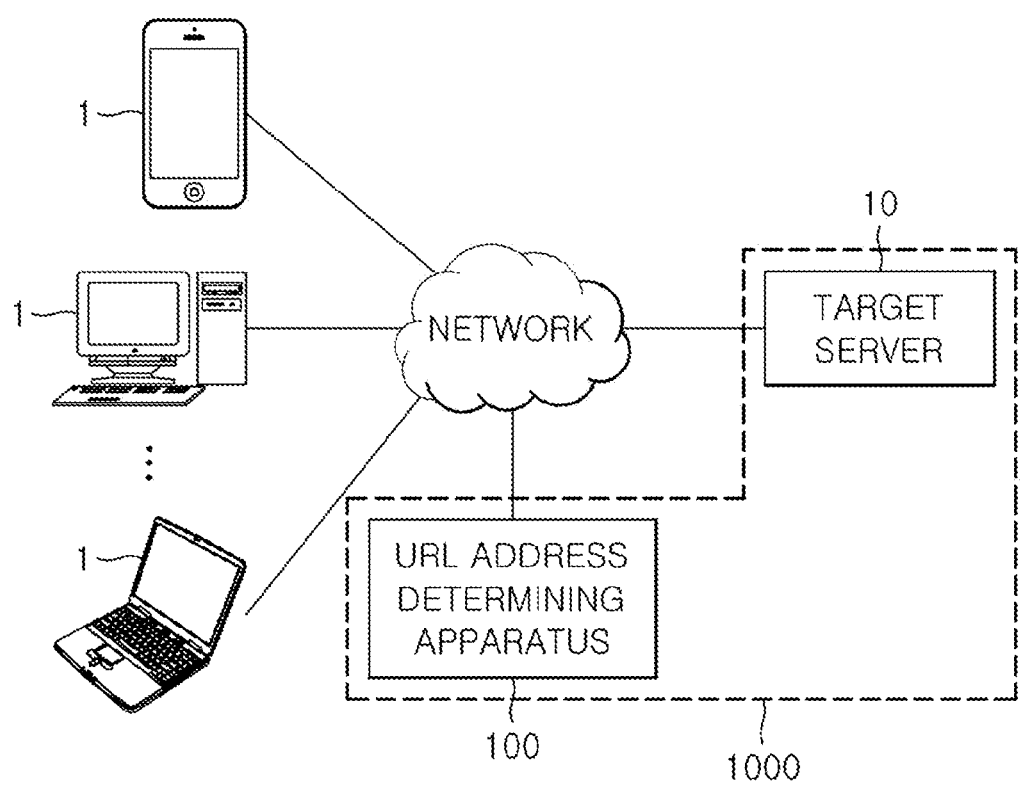
FIG. 1 is a schematic diagram illustrating a URL address determining system according to an exemplary embodiment of the present invention.

Hereinafter, exemplary embodiments disclosed in the present specification will be described in detail with reference to the accompanying drawings, and the same or similar constituent elements are denoted by the same reference numerals regardless of the reference numerals, and a redundant description thereof will be omitted. The suffixes "module" and "unit" for constituent elements used in the following description are given or mixed in consideration of ease of the writing of the specification, and do not have distinct meanings or roles by themselves. That is, the term "unit" used in the present invention may mean a hardware constituent element, such as software, a field programmable gate array (FPGA) or an application specific integrated circuit (ASIC), and the "unit" performs specific functions. However, the "unit" does not have meaning limited to software or hardware.

The "unit" may be configured to be present in an addressable storage medium or may also be configured to be reproduced in one or more processors. Accordingly, as an example, the "unit" includes constituent elements, such as software constituent elements, object-oriented software constituent elements, class constituent elements, and task constituent elements, processes, functions, attributes, procedures, sub-routines, segments of a program code, drivers, firmware, a micro code, a circuit, data, a database, data structures, tables, arrays, and variables. Functions provided within the constituent elements and the "units" may be combined with a smaller number of constituent elements and "units", or may be further separated to additional constituent elements and "units".

In describing the exemplary embodiments disclosed in the present specification, when it is determined that a detailed explanation of related publicly-known technology may obscure the subject matter of the embodiments disclosed herein, the detailed description thereof will be omitted. Further, the accompanying drawings are provided only for helping easy understanding of the exemplary embodiments disclosed herein, and the technical spirit disclosed herein is not limited by the accompanying drawings, and it should be appreciated that the present invention includes all of the modifications, equivalents, and substitutes included in the spirit and the technical scope of the present invention.

FIG. 1 is a schematic diagram illustrating a URL address determining system according to an exemplary embodiment of the present invention.

Referring to FIG. 1, a URL address determining system 1000 according to an exemplary embodiment of the present invention may include a target server 10 and a URL address determining apparatus 100.

The target server 10 may be connected to various types of terminal devices 1 through a network, and may be a web server that provides a web service or the like to each of the terminal devices 1. The target server 10 may include a plurality of web pages for providing a web service, and the target server 10 may include a plurality of corresponding uniform resource locator (URL) addresses in each web page.

Since various types of attacks on web servers, such as web hacking and malicious codes, have recently been attempted, the target server 10 may perform web security vulnerability diagnosis and the like to prevent attacks from the outside and maintain security. That is, the target server 10 may check a defect of hardware or software or an imperfection in the design through the vulnerability diagnosis.

Here, the target server 10 may be implemented in a physical configuration including hardware and software configurations, as illustrated in FIG. 1, and according to an exemplary embodiment, the target server 10 may also be implemented as a virtual machine in a cloud server.

The URL address determining apparatus 100 may analyze each URL address included in the target server 10, and distinguish whether a resource indicated by the URL address is a file or a directory. In general, when the vulnerability is diagnosed, the URL address of the target server 10 may be checked. In this case, a checking method or a determination criterion used when diagnosing the vulnerability may depend on whether a resource within the target server 10 indicated by each URL address is a file or a directory. Therefore, the URL address determining apparatus 100 may be used to accurately determine the resources indicated by the respective URL addresses.

The URL address determining apparatus 100 is illustrated as an independent apparatus in FIG. 1, such as a computer server, but according to an exemplary embodiment, the URL address determination apparatus 100 may also be included in a diagnosis apparatus (not illustrated) for diagnosing vulnerability and the like of the target server 10. In addition, when the target server 10 is a virtual machine in a cloud server, the URL address determining apparatus 100 may be implemented in the form of a virtual machine included in the same cloud server.

In the related art, it is determined whether the resource is a file or a directory by using only the format of a URL address when determining a URL address. However, since the URL address may be displayed while being partially omitted for convenience, it may be difficult to accurately determine whether the resource is a file or a directory by using only the format of the URL address. On the other hand, the URL address determining apparatus 100 according to an exemplary embodiment of the present invention can determine the type of resource through the response of the target server 10 to the URL address in addition to the format of the URL address, thereby accurately determining the type of resource indicated by the URL address. Hereinafter, the URL address determining apparatus 100 according to an exemplary embodiment of the present invention will be described.

Figure 2:
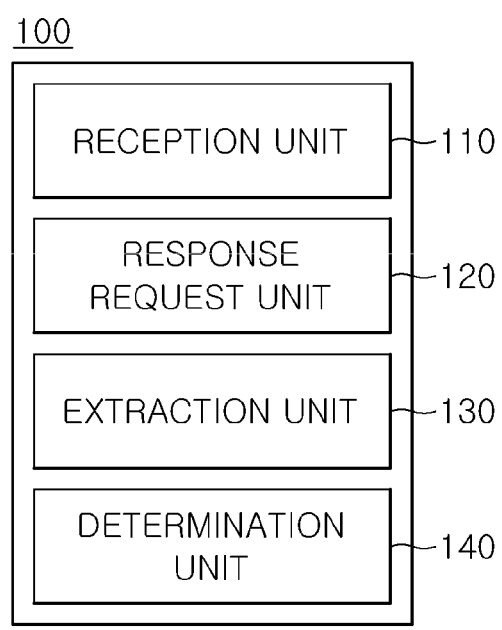
FIG. 2 is a block diagram illustrating a URL address determining apparatus according to an exemplary embodiment of the present invention.

Referring to FIG. 2, the URL address determining apparatus 100 according to an exemplary embodiment of the present invention may include a reception unit 110, a response request unit 120, an extraction unit 130, and a determination unit 140. Each of the units 110, 120, 130, 140 may be implemented in a separate processor designed to perform a corresponding task, or they may all be implemented in one processor that performs each of the functions of all the units. In some embodiments, units 110, 120, 130, 140 may be software components whose code or instructions are performed by one or more processors The reception unit 110 may receive a URL address extracted from the target server 10. The target server 10 may include a plurality of URL addresses, and the reception unit 110 may collect URL addresses of the target server 10 to determine the URL addresses of the target server 10. In this case, the URL address of the target server 10 may be collected by using a web crawler (not illustrated), and the reception unit 110 may collect URL addresses of the target server 10 by a method of receiving the URL address from the web crawler. According to an exemplary embodiment, the reception unit 110 may also directly extract the URL address from the target server 10.

According to the exemplary embodiment, the reception unit 110 may check a character located at a designated position of the character string in the collected URL address, and may determine whether the character corresponds to a predetermined identification character. Subsequently, the reception unit 110 may determine that the URL address indicates a directory resource when the character located at the designated position corresponds to the identification character, and the reception unit 110 may defer the determination when the character at the designated position is not the identification character. Here, the designated position and the identification character may be variously selected according to the format of the URL address.

In general, when the last character of the character string in the URL address is a slash "/", it may be determined that the URL address indicates a directory resource, and when the last character of the URL address is not a slash, it may be determined that the URL address indicates a file resource. However, when displaying the URL address, the last character, slash "/", is omitted in a certain case. In this case, the URL address may indicate a directory resource, not a file.

Therefore, the last character of the character string in the URL address may be set as the designated position, and a slash may be set as the identification character. In this case, the reception unit 110 first checks the last character of the URL address, and when the last character is a slash, the reception unit 110 may determine that the URL address indicates a directory resource, and when the last character is not a slash, the reception unit 110 may defer determination.

For example, when the URL address is "http://www.exaple.com/a/b/", the reception unit 110 may check the last character of the URL address. Here, since the last character is a slash "/", the reception unit 110 may determine that the URL address indicates a directory resource. On the other hand, when the URL address is "http://www.exaple.com/a/b", the reception unit 110 may not make an accurate determination by using only the current URL address and thus defer determination.

The response request unit 120 may request a response corresponding to the URL address from the target server 10. According to an exemplary embodiment, the response request unit 120 may also request a response corresponding to the URL address from the target server 10 only when the character located at the designated position of the character string of the URL address is not an identification character. That is, the response request unit 120 may request a response from the target server 10 only when, as in "http://www.exaple.com/a/b", the slash is omitted and thus it is unclear whether the resource indicated by the URL address is a file or a directory.

When receiving a request for a response to the URL address from the response request unit 120, the target server 10 may access the resource indicated by the input URL address and generate corresponding response data. Here, the response data may be generated for the purpose of displaying a web page or the like, and the response data may include a response URL address corresponding to the web page.

Specifically, when receiving a request for a response to the URL address from the response request unit 120, first, the target server 10 may check the URL address to which the target server 10 receives the request for the response. Here, when the URL address (http://www.exaple.com/a/b) that is the same as the URL address (http://www.exaple.com/a/b) to which the target server 10 receives the request for the response is included in the target server 10, the target server 10 may provide corresponding response data by directly using the corresponding URL address. That is, since the URL address to which the target server 10 receives the request for the response indicates a file resource, the target server 10 may generate response data corresponding to the file resource by directly using the corresponding URL address. Here, the response data may include the same URL address as the URL address to which the target server 10 receives the request for the response as the response URL address.

On the other hand, when the same URL address as the URL address (http://www.exaple.com/a/b) to which the target server 10 receives the request for the response is not included in the target server 10, the target server 10 may perform redirection to the corrected URL address (http://www.exaple.com/a/b/) in which a slash is added to the last character of the URL address. That is, the URL address to which the response request unit 120 requests the response is an incorrect address in which the last character, the slash, is omitted from the actual URL address. However, for the convenience of the user, the target server 10 may be set in advance to perform redirection to the correct URL address with a slash added to the last character. In this case, the target server 10 may generate corresponding response data by accessing the directory with the corrected URL address, and the response data may include a response URL address with a slash added to the last character.

Therefore, when requesting a response to an unclear URL address from the target server 10, the response request unit 120 may receive a response including the correct URL address from the target server 10.

When receiving the response data from the target server 10, the extraction unit 130 may extract a response URL address corresponding to the URL address from the response data. That is, since the response data includes the response URL address that is a correct URL address corresponding to the URL address to which the response request unit 120 requests the response, the extraction unit 130 may extract the response URL address from the response data. Then, the extracted response URL address may be used to accurately determine the resource indicated by each URL address.

The determination unit 140 may determine the resource indicated by the URL address by using the response URL address. Specifically, when the character located at the designated position of the character string in the response URL address is a predetermined identification character, the determination unit 140 may determine that the corresponding URL address indicates a directory resource. When the character located at the designated position is not the identification character, the determination unit 140 may determine that the corresponding URL address indicates a file resource.

That is, when the last character of the response URL address is a slash, the determination unit 140 may determine that the URL address indicates a directory resource, and when the last character of the response URL address is not a slash, the determination unit 140 may determine that the URL address indicates a file resource.

Here, since the response request unit 120 requests, from the target server 10, the response to a URL address whose last character is not a slash, a case where the last character of the response URL address is a slash corresponds to a case where the slash is added to the URL address. Accordingly, the last character of the corresponding URL address is not a slash but the determination unit 140 may determine that the URL address indicates a directory resource according to the response URL address.

Since a case where the last character of the response URL address is not a slash corresponds to a case where the URL address and the response URL address are the same as each other, the determination unit 140 may determine that the URL address indicates a file.

Accordingly, the determination unit 140 may clearly determine the resources indicated by respective URL addresses by using the response URL address.

Figure 3:
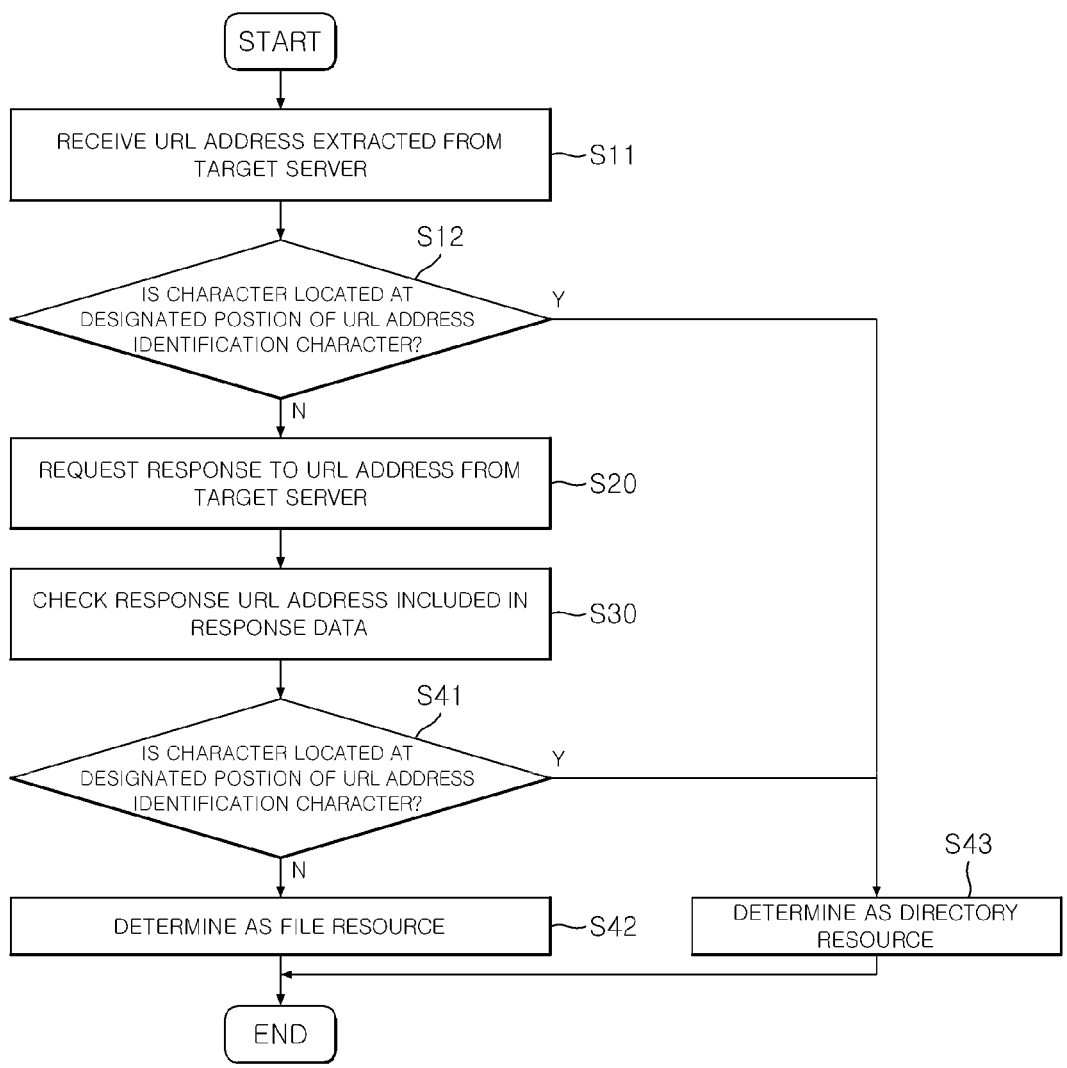
FIG. 3 is a flowchart illustrating a URL address determining method according to an exemplary embodiment of the present invention.

Referring to FIG. 3, the URL address determination method according to an exemplary embodiment of the present invention may include a reception step (S11 and S12), a response request step (S20), an extraction step (S30), and a determination step (S41, S42 and S43). Here, each step may be performed by the foregoing URL address determining apparatus 100.

In the reception step S11, the URL address extracted from the target server 10 may be received. The target server 10 may include a plurality of URL addresses, and the URL address determining apparatus 100 may collect URL addresses of the target server 10 to determine the URL addresses of the target server 10. According to an exemplary embodiment, after collecting the URL address of the target server 10 by using a separate web crawler, the URL address determining apparatus 100 may collect the URL address by a method of receiving the URL address from the web crawler.

According to an exemplary embodiment, it is possible to check the character located at the designated position of the character string of the URL address collected in the reception step (S12). Here, when the character located at the designated position is a predetermined identification character, it is determined that the URL address indicates a directory resource (S43), and when the character located at the designated position is not the identification character, the determination may be deferred.

The designated position and the identification character can be variously selected according to the format of the URL address. According to an exemplary embodiment, the last character of the character string in the URL address may be set as the designated position, and a slash may be set as the identification character. In this case, in the reception step (S12), it is possible to check the last character of the character string in the URL address. When the last character is a slash "/", it may be determined that the URL address indicates the directory resource (S43), and when the last character is not a slash, the determination may be deferred.

That is, when displaying the URL address, the last character, slash "/", may be omitted in a certain case. When the last character of the URL address is not a slash, the type of resource can be checked through a subsequent response from the target server 10.

In the response request step (S20), a response corresponding to the URL address may be requested from the target server 10. Here, in the response request step (S20), it is also possible to request a response corresponding to the URL address from the target server 10 only when the character located at the designated position of the character string in the URL address is not the identification character. That is, only when the last character of the URL address is not a slash, it is possible to request a response to the URL address from the target server 10. Here, a case where the last character of the URL address is not a slash corresponds to a case where it is unclear whether the resource indicated by the URL address is a file or a directory.

In the extraction step S30, when response data is received from the target server 10, the response URL address corresponding to the URL address may be extracted from the response data. That is, since the response data includes the response URL address corresponding to the URL address to which the response request unit 120 requests the response, the response URL address may be extracted from the response data. Then, the extracted response URL address may be used to accurately determine the resource indicated by each URL address.

In the determination step S41, the resource indicated by the URL address may be determined using the response URL address. Specifically, when the character located at the designated position of the character string in the response URL address is an identification character, it may be determined that the URL address indicates a directory resource (S43). When the character located at the designated position is not the identification character, it may be determined that the URL address indicates a file resource (S42). That is, when the last character of the response URL address is a slash, it may be determined that the URL address indicates a directory resource (S43), and when the last character of the response URL address is not a slash, it may be determined that that the URL address indicates a file resource (S42).

The present invention may be implemented as a computer readable code in a medium in which a program is recorded. The computer readable medium may continuously store a computer executable program, or temporarily store a computer executable program for execution or downloading. Further, the medium may be various recording means or storage means in the form of a single or several hardware combined, and is not limited to a medium directly connected to a specific computer system, but may also be distributed in a network. Examples of the medium may include a medium configured to store a program command, including a magnetic medium, such as a hard disk, a floppy disk, and a magnetic tape, an optical-recording medium, such as a compact disc read only memory (CD-ROM) and a digital video disc (DVD), a magneto-optical medium, such as a floptical disk, a read only memory (ROM), a random access memory (RAM), and a flash memory. Further, another example of the medium may include a recording medium or a storage medium managed by an app store for distributing applications, or a site and a server for supplying or distributing various software, and the like. Accordingly, the above detailed description should not be construed as limiting in all aspects and should be considered illustrative. The scope of the present invention should be determined by reasonable interpretation of the appended claims, and all changes within the equivalent scope of the present invention are included in the scope of the invention.

The present invention is not limited to the exemplary embodiment and the accompanying drawings. It will be apparent to those skilled in the art that constituent elements according to the present invention may be substituted, modified, and changed without departing from the technical spirit of the present invention.

What is claimed is:

1. A method of determining, by a computer server, a resource corresponding to a uniform resource locator (URL) address, the method comprising:

extracting at least one URL address from a plurality of URL addresses in a target server, wherein the target server includes a plurality of web pages for providing web services and a plurality of corresponding URL addresses in each web page;

receiving said at least one URL address extracted from the target server;

checking a character located at a designated position of a character string in said at least one URL address and determining that the URL address indicates a directory resource when the character located at the designated position is a predetermined identification character;

requesting a response corresponding to the received URL address from the target server when said character is not said predetermined identification character, wherein the target server performs redirection to a correct URL address when the received URL address is not included in the target server;

extracting a response URL address from a response data sent by the target server responsive to the response request, wherein the response data is generated for the purpose of displaying a web page, and the response data includes the response URL address corresponding to the web page; and determining a resource indicated by the received URL address by using the response URL address, wherein the determining of the resource includes determining that the received URL address indicates a directory resource when the character located at the designated position of the character string in the response URL address is a predetermined identification character, and determining that the received URL address indicates a file resource when the character located at the designated position is not the identification character.

2. A method of determining, by a computer server, a resource corresponding to a uniform resource locator (URL) address, the method comprising:

extracting a URL address from a plurality of URL addresses in a target server, wherein the target server includes a plurality of web pages for providing web services and a plurality of corresponding URL addresses in each web page;

receiving said URL address extracted from the target server;

checking whether the last character of the received URL address is a slash, and determining that the received URL address indicates a directory resource when the last character of the received URL address is a slash and without requesting the response to the received URL address from the target server;

requesting a response corresponding to the received URL address from the target server when the last character of the received URL address is not a slash, wherein the target server performs redirection to a correct URL address when the received URL address is not included in the target server;

checking a response URL address included in response data sent by the target server responsive to the response request, wherein the response data is generated for the purpose of displaying a web page, and the response data includes the response URL address corresponding to the web page;

determining that the received URL address indicates a file resource when the response URL address is the same as the received URL address; and determining that the received URL address indicates a directory resource when the response URL address has a slash added at the end of the response URL address.

3. A non-transitory computer readable recording medium storing a program which, when executed by a processor, causes the processor to perform the method of determining the resource corresponding to the URL address according to claim 1.

4. An apparatus for determining a resource corresponding to a uniform resource locator (URL) address, the apparatus comprising:

at least one processor configured to include a plurality of functional units each being configured to perform corresponding functions, the plurality of functional units including:

a reception unit configured to extract a URL address from a plurality of URL addresses in a target server and receive said URL address extracted from the target server, wherein the target server includes a plurality of web pages for providing web services and a plurality of corresponding URL addresses in each web page, said reception unit configured to check a character located at a designated position of a character string in said URL address and determining that the URL address indicates a directory resource when the character located at the designated position is a predetermined identification character;

a response request unit configured to request a response from the target server corresponding to the received the URL address when said character is not said predetermined identification character, wherein the target server performs redirection to a correct URL address when the received URL address is not included in the target server;

an extraction unit configured to extract a response URL address from response data sent by the target server responsive to the response request, wherein the response data is generated for the purpose of displaying a web page, and the response data includes the response URL address corresponding to the web page; and a determination unit configured to determine a resource indicated by the received URL address by comparing the received URL address with the response URL address, wherein a determination unit configured for determining that the received URL address indicates a directory resource when the character located at the designated position of the character string in the response URL address is a predetermined identification character, and determining that the received URL address indicates a file resource when the character located at the designated position is not the identification character.

* * * * *